United States Patent
Nitsure et al.

(10) Patent No.: US 12,147,437 B2
(45) Date of Patent: Nov. 19, 2024

(54) INTERPRETABILITY OF RESULTS FROM COGNITIVE SEMANTIC CLUSTERING QUERIES OVER RELATIONAL DATBASES

(71) Applicant: International Business Machines Corporation, Armonk, NY (US)

(72) Inventors: Apoorva Nitsure, Pittsburgh, PA (US); Rajesh Bordawekar, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 18/045,905

(22) Filed: Oct. 12, 2022

(65) Prior Publication Data

US 2024/0126767 A1    Apr. 18, 2024

(51) Int. Cl.
G06F 16/20 (2019.01)
G06F 16/2457 (2019.01)
G06F 16/248 (2019.01)
G06F 16/28 (2019.01)

(52) U.S. Cl.
CPC ...... *G06F 16/24578* (2019.01); *G06F 16/248* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 9,317,829 B2 * | 4/2016 | Anand | G06F 16/35 |
| 10,176,245 B2 | 1/2019 | Lim et al. | |
| 10,831,752 B2 | 11/2020 | Bordawekar et al. | |
| 10,984,030 B2 | 4/2021 | Bordawekar et al. | |
| 11,074,253 B2 | 7/2021 | Bordawekar et al. | |
| 11,182,414 B2 | 11/2021 | Bandyopadhyay et al. | |
| 2006/0106793 A1 * | 5/2006 | Liang | G06F 16/951 707/999.005 |
| 2007/0276810 A1 * | 11/2007 | Rosen | G06F 16/38 |
| 2015/0026153 A1 | 1/2015 | Gupta et al. | |
| 2020/0210431 A1 | 7/2020 | Bordawekar et al. | |

OTHER PUBLICATIONS

Allen, et al., "Analogies Explained: Towards Understanding Word Embeddings," arXiv:1901.09813v2 [cs.CL] May 11, 2019.
Church, et al., "Word Association Norms, Mutual Information, and Lexicography," Computational Linguistics vol. 16, No. 1, Mar. 1990.
Bouma, "Normalized (Pointwise) Mutual Information in Collocation Extraction," Proceedings of the Biennial GSCL Conference, 2009.
Bordawekar, et al., "Semantic Indices for Accelerating Semantic Queries On Databases," U.S. Appl. No. 17/546,343, filed Dec. 9, 2021.

* cited by examiner

*Primary Examiner* — Jau Shya Meng
(74) *Attorney, Agent, or Firm* — Amin, Turocy & Watson, LLP

(57) ABSTRACT

System and method herein interpret results of a semantic clustering Structured Query Language (SQL) Cognitive Intelligence (CI) query by identifying dominant traits of a query input to determine a ranking of query results by identifying influential tokens of the query input based on data statistics and observing the dominant traits in influential tokens of a query output, wherein the identifying the dominant traits of the query input comprises incorporating co-occurrence measurements.

20 Claims, 8 Drawing Sheets

Query Input: 300

| Department 304 |
|---|
| Travel, Sustenance, and Lodging |
| Travel, Supplements, and Aid |
| Travel Meal Reimbursement (IRS) |

FIG. 3A

Query Output: 302

| Department 306 |
|---|
| Computer Processor Installment Purchases |
| Travel Meal Reimbursement (non IRS) |
| Travel Public Carriers |

FIG. 3B

Query Input Influential Tokens: 400

| Department 304 | Vendor Name 404 | Sub Program Key 406 | Fund Detail Key 408 |
|---|---|---|---|
| Travel, Sustenance, and Loding | Agency Transaction Voucher, Bank of America | 3048<br>2816 | 3478<br>6880 |
| Travel, Supplements, and Aid | Greater Richmond Transit Company, Agency Transaction Voucher | 3791<br>4438 | 3641<br>344 |
| Travel Meal Reimbursement (IRS) | Deposit Certificate, Payroll | 2202<br>2407 | 8459<br>513 |

FIG. 4A

Query Output Influential Tokens: 402

| Department 306 | Vendor Name 410 | Sub Program Key 412 | Fund Detail Key 414 |
|---|---|---|---|
| Computer Processor Installment Purchases | Agency Transaction Voucher | 2447<br>4502 | 986<br>1559 |
| Travel Meal Reimbursement (Non-IRS) | Agency Transaction Voucher, Usage Cost | 3048<br>4283 | 3478<br>342 |
| Travel Public Carriers | Agency Transaction Voucher | 2816<br>3048 | 1541<br>1400 |

FIG. 4B

Query Input Primary Key Values 500

| CustID 504 | Dependents 508 | Partner 510 | Tenure 512 | Monthly Charges 514 | Total Charges 516 | Churn 518 |
|---|---|---|---|---|---|---|
| 1235 | No | No | 49 (c3) | 103.70 (c3) | 5036.3 (c3) | Yes |
| 8982 | Yes | Yes | 47 (c3) | 99.35 (c3) | 4749.15 (c3) | Yes |
| 7456 | No | No | 40 (c3) | 104.50 (c3) | 4036.85 (c2) | Yes |

Query Output Primary Key Values 502

| CustID 506 | Dependents 520 | Partner 522 | Tenure 524 | Monthly Charges 526 | Total Charges 528 | Churn 530 |
|---|---|---|---|---|---|---|
| 5673 | No | No | 41 (c3) | 104.70 (c3) | 4346.4 (c3) | Yes |
| 9878 | Yes | Yes | 50 (c3) | 103.85 (c3) | 5017.9 (c3) | Yes |
| 4444 | No | No | 42 (c3) | 101.75 (c3) | 4273.45 (c3) | Yes |

Query Input Attributes with Associated Discriminatory Scores 600

| CustID 504 | Dependents 508 | Partner 510 | Tenure 512 | Monthly Charges 514 | Total Charges 516 | Churn 518 |
|---|---|---|---|---|---|---|
| 1235 | No (0.08) | No (0.02) | 49 (c3) (0.25) | 103.70 (c3) (0.27) | 5036.3 (c3) (0.12) | Yes (0.15) |
| 8982 | Yes (0.03) | Yes (0.05) | 47 (c3) (0.25) | 99.35 (c3) (0.27) | 4749.15 (c3) (0.12) | Yes (0.15) |
| 7456 | No (0.08) | No (0.02) | 40 (c3) (0.25) | 104.50 (c3) (0.27) | 4036.85 (c2) (0.1) | Yes (0.15) |

Query Output Attributes with Associated Discriminatory Scores 602

| CustID 506 | Dependents 520 | Partner 522 | Tenure 524 | Monthly Charges 526 | Total Charges 528 | Churn 530 |
|---|---|---|---|---|---|---|
| 5673 | No | No | 41 (c3) | 104.70 (c3) | 4346.4 (c3) | Yes |
| 9878 | Yes | Yes | 50 (c3) | 103.85 (c3) | 5017.9 (c3) | Yes |
| 4444 | No | No | 42 (c3) | 101.75 (c3) | 4273.45 (c3) | Yes |

INTERPRETABILITY OF RESULTS FROM COGNITIVE SEMANTIC CLUSTERING QUERIES OVER RELATIONAL DATBASES

BACKGROUND

One or more embodiments described herein relate generally to AI-Powered Databases and the execution of Cognitive Intelligence (CI) Queries over such AI-Powered Databases. Embodiments relate to interpreting results from semantic clustering queries using structured query language, and more specifically, to interpret results from different cognitive queries for both prediction and analytics.

SUMMARY

The following presents a summary to provide a basic understanding of one or more embodiments described herein. This summary is not intended to identify key or critical elements, or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate interpretability of results from cognitive semantic clustering queries for quantum computing are described.

According to an embodiment, a system can comprise a memory that stores computer executable components and a processor that executes the computer executable components stored in the memory. The computer executable components can include an interpretability component that can identify dominant traits of a query input to determine a ranking of query results by identifying influential tokens of the query input based on data statistics and observing the dominant traits in influential tokens of a query output. Further, the interpretability component can identify the dominant traits of the query input by incorporating co-occurrence measurements.

Additionally, the interpretability component can display the dominant traits of the query input reflected in an output of the query input. The interpretability component can further interpret results from queries on both existing data and unseen data. The interpretability component can determine the dominant traits by comparing common influential tokens belonging to the query input and to the resulting query output. Further, the query input can be based on non-primary key values; and the interpretability component can locate influential neighborhood tokens in determining the dominant traits. Additionally or alternatively, the query input can be based on primary key values; the interpretability component can transform the query input to create an artificial vector; and the interpretability component can locate tokens that substantially contribute to the generation of the artificial vector.

According to another embodiment, a computer-implemented method of providing insights to interpret results of a semantic clustering SQL Cognitive Intelligence (CI) query can comprise identifying, using a processor operatively coupled to memory, dominant traits of a query input; and determining, using the processor, a ranking of query results by identifying influential tokens of the query input based on data statistics and observing the dominant traits in influential tokens of a query output.

According to yet another embodiment, a computer program product providing insights to interpret results of a semantic clustering SQL Cognitive Intelligence (CI) query, the computer program product can comprise a computer readable storage medium having program instructions embodied therewith, the program instructions executable by a processor can cause the processor to identify, using the processor operatively coupled to memory, dominant traits of a query input; and determine, using the processor, a ranking of query results by identifying influential tokens of the query input based on data statistics and observing the dominant traits in influential tokens of the query output.

DESCRIPTION OF THE DRAWINGS

FIG. 3A illustrates a table of an example, non-limiting query input that can be received by the non-limiting system to facilitate interpreting results of a semantic clustering Cognitive Intelligence (CI) query, in accordance with one or more embodiments described herein.

FIG. 3B illustrates a table of an example, non-limiting query output that can be produced by the non-limiting system to facilitate interpreting results of a semantic clustering Cognitive Intelligence (CI) query, in accordance with one or more embodiments described herein.

FIG. 4A illustrates a table of an example, non-limiting query input with non-primary keys that can be received by the non-limiting system such as to produce top discriminatory columns and identify associated influential tokens, in accordance with one or more embodiments described herein.

FIG. 4B illustrates a table of an example, non-limiting query output with non-primary keys and associated influential tokens that can be received by the non-limiting system, in accordance with one or more embodiments described herein.

FIG. 5A illustrates a table of an example, non-limiting query input with primary keys that can be received by the non-limiting system and include one or more attributes, in accordance with one or more embodiments described herein.

FIG. 5B illustrates a table of an example, non-limiting query output with primary keys that can be received by the non-limiting system such as to produce top tokens that include the dominant traits of the query input, in accordance with one or more embodiments described herein.

FIG. 6A illustrates a table of an example, non-limiting query input and the associated discriminatory scores per attribute, in accordance with one or more embodiment described herein.

FIG. 6B illustrates a table of an example, non-limiting query output indicating the dominant traits from the query input, in accordance with one or more embodiments described herein.

DETAILED DESCRIPTION

Figure 1:
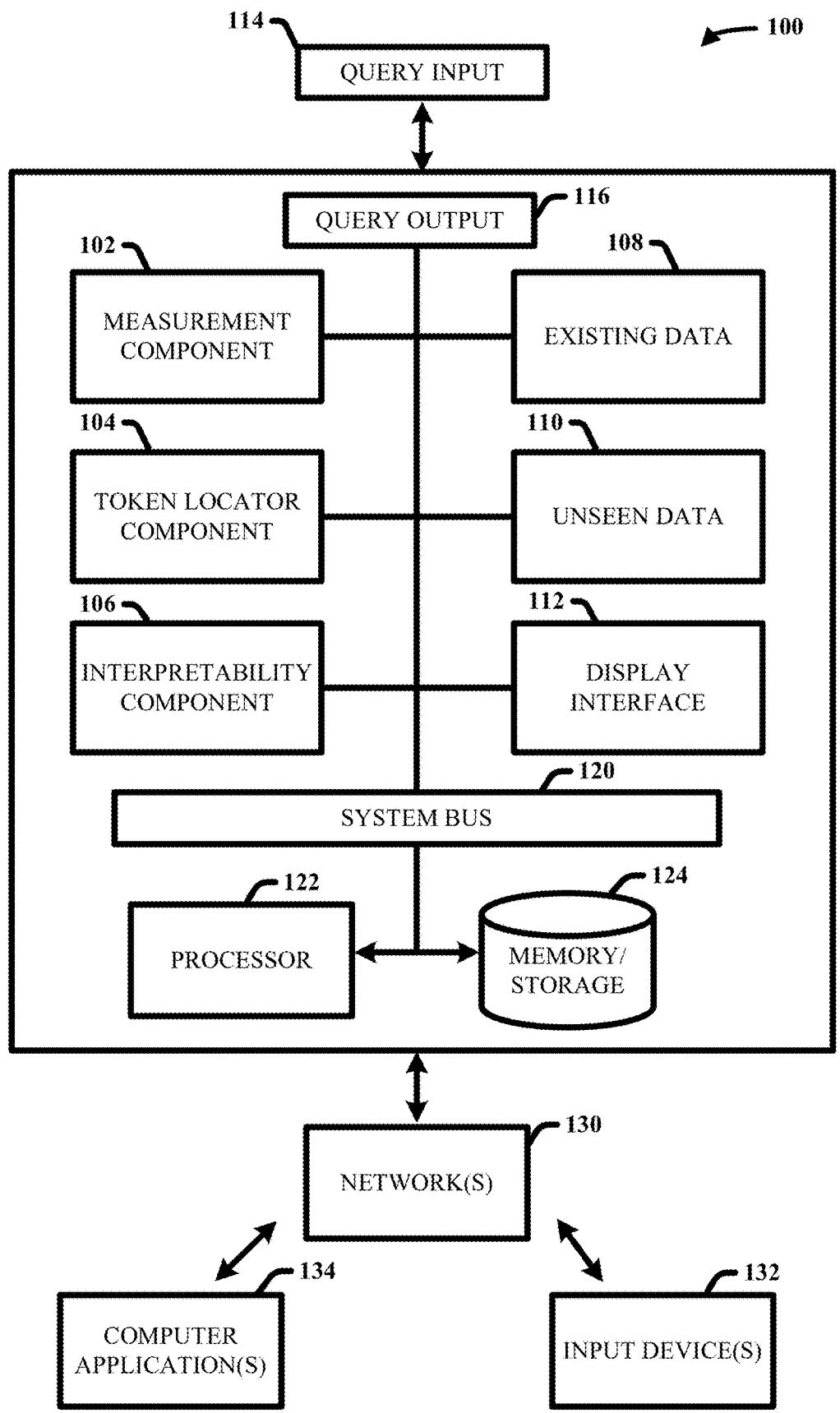
FIG. 1 illustrates a block diagram of an example, non-limiting system that can facilitate providing insights to interpret results of a semantic clustering Cognitive Intelligence (CI) query, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

Queries can be used to search databases both domestically and commercially in various industries. For example, unique databases can be constructed including structured or unstructured data related to medical history, financial backgrounds, purchase history, item availability and/or the like. These databases can be searched using various query types such as similarity, analogy, antonym, prediction, structured query language (SQL), cognitive intelligence (CI) and/or the like. Such databases can be AI-powered databases where machine learning is incorporated into the database.

In some cases, a structured database can include structured relational data related to a plurality of entities for analysis. Such structured database can be typed, meaning that entities included therein can include data and/or subsets of data related to one or more entity types, such as classifications, categories and/or the like. Further, the data itself can alternatively or additionally be varied, such as including dates, numbers, words, phrases, abbreviations and/or other text. Each entry, or row, can in some embodiments be represented by a unique primary key. In examples, a typed relational database, having structured data, can be enhanced by using an unsupervised neural network integrated with quantum processors and/or quantum computing. The AI-powered database can use semantic word vector representations of relational entities to enable one or more semantic queries, such as cognitive intelligence (CI) queries.

Upon execution of a cognitive intelligence query by a user, such as a machine, device, component, hardware, software or human, one or more results can be returned to the user. Depending on the query or the particular database, in one or more instances, a plurality of results can be ranked. In other instances, only one or more results can be returned, while others are not returned or are ignored.

Nonetheless, even though results can be provided, a problem associated with query execution approaches, such as cognitive intelligence query execution approaches, is that they are not supported with an ability to output information regarding the interpretability of the query results. Given these problems, one or more embodiments described herein can be implemented to produce a solution to one or more of these problems in the form of systems, computer-implemented methods, and/or computer program products that can facilitate the following processes: i) identifying, using a processor operatively coupled to memory, dominant traits of a query input; and ii) determining, using the processor, a ranking of query results by identifying influential tokens of the query input based on data statistics and observing the dominant traits in influential tokens of a query output. That is, embodiments described herein include one or more systems, computer implemented methods, apparatuses and/or computer program products that can facilitate one or more of the aforementioned processes.

FIG. 1 illustrates a block diagram of an example, non-limiting system 100 that comprises a measurement component 102, a token locator component 104, and an interpretability component 106. Additionally, the interpretability component 106 can be operatively connected with a portion of existing data 108 (e.g., can be connected such as to process existing data with analytics), unseen data 110 (e.g., can be connected such as to process unseen data with predictive processing), and a display interface 112. The non-limiting query result interpretation system 100 can receive a query input 114 and can execute the corresponding query via components of the query result interpretation system 100 (e.g., the measurement component 102, the token locator component 104, and the interpretability component 106) to generate the associated query output 116. Further, the query result interpretation system 100 can provide insights into the query output 116; moreover, the system 100 can indicate to a user why certain results were achieved by displaying a discriminatory score and/or the associated influential tokens (e.g., via the display interface 112). Repetitive description of like elements employed in other embodiments described herein is omitted for sake of brevity. Aspects of systems (e.g., the query result interpretation system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Additional description of functionalities will be further described below with reference to the example embodiments of FIGS. 1 and 2, where repetitive description of like elements and/or processes employed in respective embodiments is omitted for sake of brevity. The query result interpretation system 100 can facilitate: i) identifying dominant traits of a query input 114; ii) determining a ranking of query results by identifying influential tokens of the query input 114 based on data statistics of the relational database and observing the dominant traits in influential tokens of the query output 116; iii) incorporating co-occurrence measurements (e.g., via the measurement component 102) to identify the dominant traits of the query input 114; and iv) displaying the dominant traits of the query input 114 reflected in an output of the query input 114.

Figure 8:
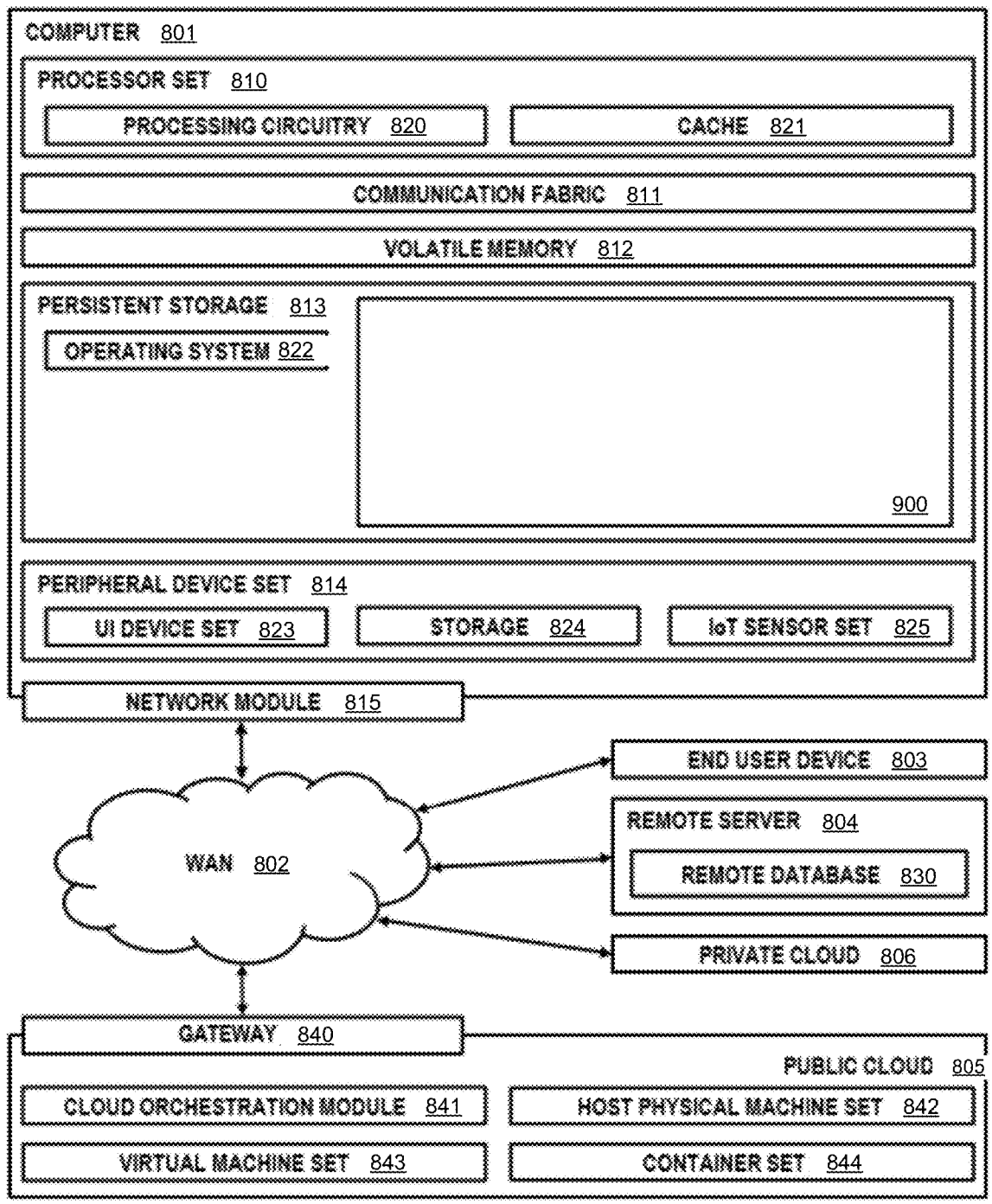
FIG. 8 illustrates a block diagram of an example, non-limiting operating environment in which one or more embodiments described herein can be facilitated.

The interpretability component 106 can be operatively linked with the with measurement component 102, the token locator component 104, the display interface 112, the query input 114, and the query output 116, such as to provide insights to a user regarding the resulting query output 116. The query interpretation system can be connected with a system bus 120, a processor 122, a memory/storage component 124, one or more networks 130, one or more input devices 132, and one or more computer application 134, which can be associated with cloud computing environment 800 (FIG. 8).

In embodiments, FIG. 1 illustrates a block diagram of an example, non-limiting query result interpretation system 100 that can address the challenges of query interpretability in accordance with one or more embodiments described herein. The query result interpretation system 100 can generate vectors of information corresponding to the database information (e.g., query input 114 and query output 116). Using these generated vectors, the query result interpretation system 100 can gain information and insights besides simply value based matching. The query input 114 can include any number of customer identifications (e.g., a specific customer ID), and the query result interpretation system 100 can find any number of specified customers similar to the query input 114. In examples, the query can be executed by the query result interpretation system 100 or as part of a component connected with the query result interpretation system 100. The query result interpretation system 100 can provide interpretability information to assist a user in understanding the results from a particular query; for example, displaying the factors/features that led to the particular query result and what factors/features are substantially similar between the query results (e.g., see also FIG. 2). Further, the interpretability information can involve determining and displaying the dominant traits of the query input 114 reflected in the query output 116.

In embodiments, the query input 114 can include three chosen values from a column (e.g., from the associated AI-powered database, database schema information, data statistics, or training document) and the query result interpretability system 100 can display to the user values belonging to the same column that capture the dominant traits among the query input 114 (e.g., via the display interface 112). For example, if the query is searching for the top five customers similar to one or more input customers, the query result interpretation system 100 determines the top 5 customer and informs the user what factors led the results to be in the top 5 (e.g., why the results were returned via a white-box approach). In other examples, the query input 114 can include three customers as input and the query result interpretation system 100 can output five customers most similar to each input customer while displaying the dominant traits.

Figure 2:
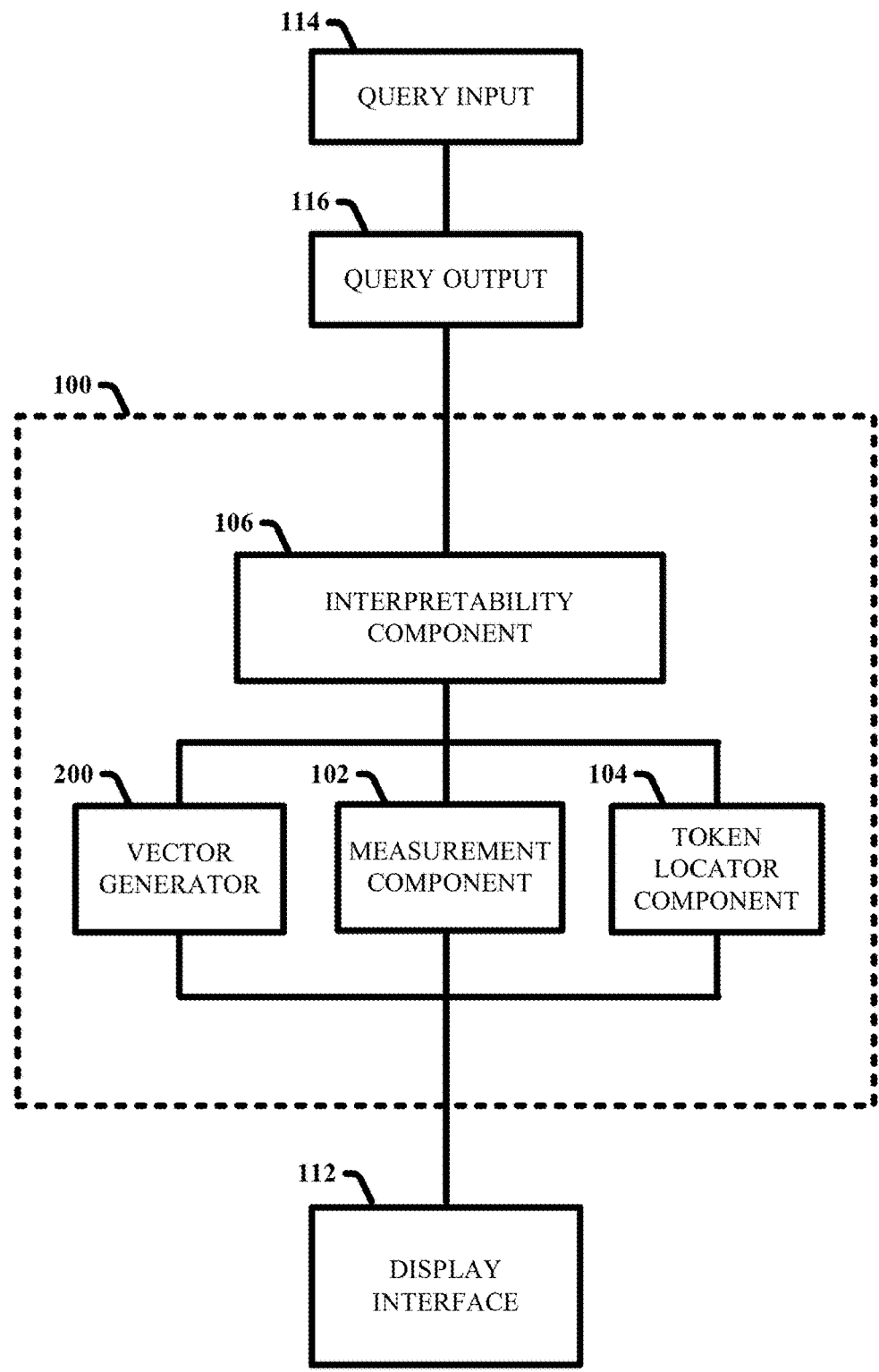
FIG. 2 illustrates a block diagram of an example, non-limiting system that can facilitate providing insights to interpret results of a semantic clustering Cognitive Intelligence (CI) query, in accordance with one or more embodiments described herein.
Figure 7:
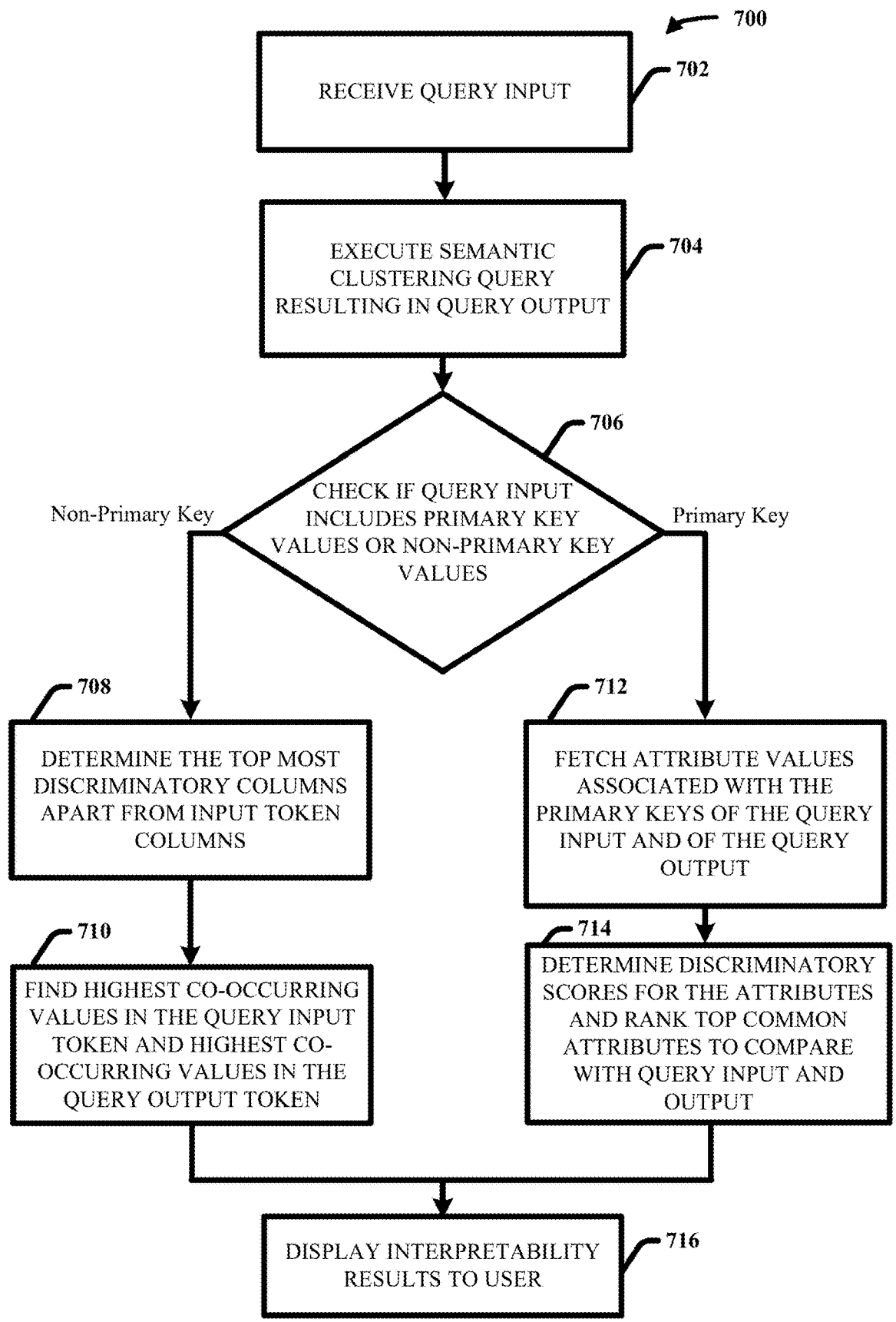
FIG. 7 illustrates a flow diagram of an example, non-limiting computer implemented method that can facilitate providing insights to interpret results of a semantic clustering Cognitive Intelligence (CI) query, in accordance with one or more embodiments described herein.

With embodiments, such as generally illustrated in FIGS. 1 and 2, the query result interpretation system 100 can include a vector generator 200 operatively connected with the interpretability component 106, the query input 114, and the query output 116. The vector generator 200 can create or generate an artificial vector that is an average of the query input 114 value vectors. For example, the query input 114 can include: i) "Customer ID One" and associated Vector One of corresponding customer information, ii) "Customer ID Two" and associated Vector Two of corresponding customer information, and iii) "Customer ID Three" and associated Vector Three of corresponding customer information. The vector generator 200 (e.g., or a vector generator connected externally to the interpretability component 106) can average Vector One, Vector Two, and Vector Three to generate an artificial average value vector. In examples, the associated vectors with customer ID's can include one or more of a variety of customer information. For example, the associated vector can include purchase history information, most common transaction, spending range, most commonly visited store section, Further, in embodiments, the interpretability component 106 can perform operations on the generated artificial average value vector with respect to the remainder of vectors of the connected AI-powered database. For example, the interpretability component 106 can calculate a cosine similarity score of the artificial vector with associated vectors of customer IDs in the AI-powered database (e.g., can be some or all of the customer ID's in the database). The resulting artificial average value vector captures the dominant traits of the customers (e.g., the query input 114) for further processing. The dominant traits can be explained by observing common influential tokens (e.g., via the token locator component 104) belonging to both the query input 114 and resulting customer ID's (e.g., the query output 116).

In embodiments, the query input 114 can include primary key values or non-primary key values. The query result interpretation system 100 or the interpretability component 106 can determine (e.g., once the query input 114 and the query output 116 are received) whether the query input 114 and the query output 116 include primary key values (e.g., customer IDs) or non-primary key values. As a result, the query result interpretation system 100 or the interpretability component 106 can determine, select and apply the associated algorithm (e.g., co-occurrence measurement via measurement component 102).

Turning now to FIGS. 3A and 3B, the query result interpretation system 100 can receive the query input 114 for execution of the semantic clustering query as shown by example table 300. The query result interpretation system 100 can receive or generate the query output 116 as shown by example table 302. Further, FIGS. 3A-4B include data corresponding to a publicly available Virginia expenditure dataset (e.g., state-tracking on the expenditure of funds) demonstrating the query result interpretation system 100. The query input 114 includes non-primary key values 304 (e.g., "Travel, Sustenance, and Lodging"; "Travel, Supplements, and Aid"; and "Travel Meal Reimbursements (IRS)") and the query output 116 includes non-primary key values 306 (e.g., "Computer Processor Installment Purchases"; "Travel Meal Reimbursement (non-IRS)" and "Travel Public Carriers"), which are not considered to be the row identifiers of the dataset columns.

Further, the interpretability component 106 can receive input tokens IT=($it_0$, $it_1$, $it_2$) 304 and the semantic clustering CI query can produce output tokens OT=($ot_0$, $ot_1$, $ot_2$) 306. The interpretability component 106 can apply a non-primary key interpretability algorithm to aid a user in understanding query results in relation to the query input 114. First, the interpretability component 106 can identify the top k most discriminatory columns: DC=($C_0$, $C_1$, ... $C_k$) apart from the input token columns 304. The top discriminatory columns be determined by calculating an influence score and a discriminatory score for the columns of the AI-powered database. These calculations can determine what factors (e.g., columns) majorly contributed to the generation of the respective customer vector; whereby the columns can be rearranged and ranked according to at least one of the influence score, discriminatory score, or combination thereof. Further, for input tokens $it_i$ in IT, and columns $C_k$ in DC, the interpretability component 106 can find the top d (e.g., about 1-5) influential tokens (e.g., the highest co-occurring values in relation to input tokens $it_i$). For output tokens $ot_i$ in OT, and columns $C_k$ in DC, the interpretability component 106 can find the top d (e.g., about 1-5) influential tokens (e.g., the highest co-occurring values in relation to output tokens $ot_i$). Co-occurring can be considered to indicate how frequently the values occur together in a row of the AI-powered database. Further, the most influential tokens 404, 406, 408, 410, 412, 414 are the most frequent co-occurring values to every individual value in the output 302 for the chosen top k (e.g., 3 as in FIGS. 3A and 3B) discriminatory columns. Influential tokens common to at least two input tokens can be reflected as influential tokens 404, 406, 408, 410, 412, 414 in the query output 116.

Turning now to FIGS. 4A and 4B which demonstrate the resulting output of the query result interpretation system 100, the interpretability component 106 can display the influential tokens (e.g., represented by columns 404, 406, and 408 of table 400) common to at least two of the input tokens as influential tokens (e.g., represented by columns 410, 412, and 414 of table 402) to the query output 116. For example, as shown in FIGS. 4A and 4B, the influential token "Agency Transaction Voucher" can be seen as a common influential token between the input 300 and the output 302. When observing or locating influential tokens of the input 300, the interpretability component 106 finds the most common tokens belonging to the most discriminatory columns (e.g., DC) for the inputs 300, and such resulting co-occurring tokens can be displayed as influential tokens to the output 302.

Turning next to FIGS. 5A and 5B, the query result interpretation system 100 can receive the query input 114 (e.g., Customer IDs 504) for execution of the semantic clustering query as shown by example table 500. The query result interpretation system 100 can receive or generate the query output 116 (e.g., Customer IDs 506) as shown by example table 502. Further, FIGS. 3A-4B include data corresponding to customer bio and expenditure data to demonstrate the query result interpretation system 100. The query input 114 includes primary key values 504 (e.g., "1235"; "8982"; and "7456") and the query output 116 includes primary key values 506 (e.g., "5673"; "9878" and "4444"), which are considered to be the row identifiers of the dataset columns.

With embodiments, such as shown in tables 500 and 502 of FIGS. 5A and 5B, primary key values 504 and 506 can include corresponding data regarding customer information located in associated columns of the customer ID. For example, such associated columns can include data corresponding to "Dependents" 508, 520; "Partner" 510, 522; "Tenure" 512, 524; "Monthly Charges" 514, 526; "Total Charges" 516, 528; and "Chum" 518, 530. The query result interpretation system 100 can receive three customer ID's (e.g., primary key values) and output three most or substantially similar customer ID's. Further, the query result interpretation system 100 can display to the user the common attributes that belong to both the input 504 and the output 506. Further, the tables and vectors can include a pre-processed representation 540 (textified representation) of the numeric value within the column (e.g., c3 for a Tenure value of 49).

Further, the interpretability component 106 can receive primary key tokens IT=($it_0$, $it_1$, $it_2$) 504 and the semantic clustering CI query can produce primary key tokens OT=($ot_0$, $ot_1$, $ot_2$) 506. The interpretability component 106 can apply a primary key interpretability algorithm to aid a user in understanding query results in relation to the query input 114. First, the interpretability component 106 can fetch textified attribute values (e.g., some or all) uniquely associated with the input primary key tokens 502. Textified attribute values associated with the input can be represented by A_IT=($A_0$, $A_1$, $A_2$); and additionally, textified attribute values associated with the output can be represented by A_OT=($AO_0$, $AO_1$, $AO_2$). Further, for the attribute set $A_i$ of A_IT, and the attributes $A_j$ belonging to the set, the interpretation component 106 can determine discriminatory scores DS associated with the attributes $A_j$ of the set. In examples, the interpretation component 106 can determine discriminatory scores for some or all attributes $A_j$ of set $A_i$.

In examples, the interpretability component 106 can find the top k attributes ($AK_1$) from $A_i$ with respect to top k higher values of discriminatory scores DS. Discriminatory scores can be an inverse frequency score indicating how many times a particular value is present in the database table (discriminatory scores 604 can be seen in table 600 of FIG. 6A). Additionally, the interpretability component 106 can find common attributes C belonging to $AK_j$ and to A_OT and display to the user within the context of the query input 114 (502) and query output 116 (506) (e.g., which can be analyzed by taking an intersection of the top k values with the various inputs to the query result interpretation system 100.

In embodiments such as illustrated by FIGS. 6A and 6B, the interpretability component 106 can determine discriminatory scores 604 for the various attribute columns 508-518. Further, the interpretability component 106 can rank the discriminatory score values to determine the top k common attributes (e.g., in this case 4) to display with the original query input as shown in table 600. For example and without limitation, the top 4 tokens in common with the input and the output, which are the columns "Tenure", "Monthly Charges", "Total Charges", and "Chum", can be highlighted/references/annotated in the query input 114 to display for a user to understand the results of a semantic clustering query as indicated in FIG. 6A. Turning to table 602, the interpretability component 106 can reflect the output of the semantic clustering query in conjunction with dominant traits as identified by the various textified data representations 540 and discriminatory scores 604.

With embodiments, a computer-implemented method 700 of interpreting results of a semantic clustering SQL Cognitive Intelligence (CI) query can comprise a first step of receiving the query input (step 702). The query result interpretation system 100 can execute the query via the query input 114 (step 704) using the processor 122. Alternatively, in other embodiments, the query result interpretation system 100 can receive the query output 116 as an alternative to executing the query. Further, the query result interpretation system 100 can determine whether the query input 114 includes non-primary key values or primary key values.

For example, non-primary key values can correspond to a query input 114 that does not include row identifiers of the generated vector (e.g., the non-primary key values can be the values in the columns of the generated vector). The generated vector (e.g., produced via the vector generator 202 or the processor 122) can capture dominant traits of the query input 114, which can be determined by looking at the common influential tokens belonging to both the query input 114 and the query output 116. Further, in embodiments, the method 700 of interpreting results can include determining the top most discriminatory columns associated with the query input 114 (e.g., apart from the input token columns themselves) (step 708). The method 700 can include finding the highest co-occurring values in the query input token and the highest co-occurring values in the query output 116 (step 710). Additionally, the method 700 can include displaying interpretability results to a user with respect to the query output 116 (step 716). For example, a user can see the influential tokens common to at least two tokens of the query input reflected as influential tokens in the query output 116.

In embodiments, after a determination that the query input 114 does not include primary key values, the method 700 can include executing steps 708, 710, and 716 to provide insights into query result interpretation (e.g., for user comprehension or confirmation). Query inputs without primary key values do not include specific customer ID's (e.g., within the AI-powered database or an associated training document). Additionally or alternatively, after a determination that the query input 114 includes primary key values, the method 700 can include executing steps 712, 714, and 716 to provide insights into query result interpretation (e.g., for user comprehension or confirmation).

With embodiments, after a determination that the query input 114 includes primary key values, the method 700 can include fetching attribute values (e.g., attributes) associated with the primary keys of the query input 114 and the query output 116 (step 712). In examples, the query input 114 and the resulting query output 116 can include primary key values, which can be unique identifier of the rows of a database. Further, primary key values can correspond to specific customer ID's within the AI-powered database. The method 700 can include determining discriminatory scores for the fetched attributes and finding common attributes belonging to the top discriminatory scores (step 714). Additionally, the method 700 can include displaying interpretability results to a user with respect to the common attributes as identified.

For example, one or more embodiments described herein of the query result interpretation system 100 and/or one or more components thereof can employ one or more computing resources of the computing environment 800 described below with reference to the illustration 800 of FIG. 8. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the query result interpretation system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the query result interpretation system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the query result interpretation system 100 can further comprise various computer and/or computing-based elements described herein with reference to computing environment 800 and FIG. 8. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the measurement component 102, the token locator component 104, the interpretability component 106, and/or another component associated with the query result interpretation system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 812 and FIG. 8. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor. Additional examples of processor 122 are described below with reference to processor set 810 and FIG. 8. The examples of processor 122 can be employed to implement any one or more embodiments described herein.

The query result interpretation system 100, the measurement component 102, the token locator component 104, and/or the interpretability component 106, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The query result interpretation system 100 can comprise any type of component, machine, device, facility, apparatus and/or instrument that comprises a processor and/or can be capable of effective and/or operative communication with a wired and/or wireless network. All suitable such embodiments are envisioned. For example, the query result interpretation system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The query result interpretation system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the query result interpretation system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the query result interpretation system 100, the measurement component 102, the token locator component 104, and/or the interpretability component 106 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the query result interpretation system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the query result interpretation system 100 and external systems, sources and/or devices (e.g., computing devices, communication devices and/or the like).

The query result interpretation system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the query result interpretation system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the measurement component 102, the token locator component 104, and/or the interpretability component 106 and/or any other components associated with the query result interpretation system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the query result interpretation system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The query result interpretation system 100 can facilitate (e.g., via processor 122) performance of operations executed by and/or associated with measurement component 102, the token locator component 104, the interpretability component 106, and/or another component associated with system 100 as disclosed herein. For instance, as described in detail below, the query result interpretation system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multi-lingual query interpretation. As will be apparent from the below, one or more systems can be employed to facilitate zero-shot transfer of the one or more language invariant signals (e.g., such as to be independent of domain/language specific training).

In embodiments, the query result interpretation system 100 can include one or more measurement components 102, one or more token locator components 104, one or more interpretability components 106, one or more system buses 120, one or more processors 122, one or more memory/storage components 124, one or more networks 130, one or more input devices 132, and/or one or more computer applications 134. The measurement component 102, the token locator component 104, and the interpretability component 106 can be connected with one or more machines comprised by the query result interpretation system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning next to FIG. 8, the following discussion and associated figure are intended to provide a short general description of a suitable computing environment 800 in which one or more embodiments described herein at FIGS. 1-7 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as interpretability of semantic query results code block 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments.

Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable instructions; and
   a processor, operably coupled to the memory, and that executes at least one of the computer executable instructions that:
   identifies, by incorporating co-occurrence measurements, dominant traits of a query input to determine a ranking of query results by identifying influential tokens of the query input based on data statistics and observing the dominant traits in influential tokens of a query output, wherein the query input is based on one or more primary key values, and the identifying the influential tokens comprises:

transforming the query input to create an artificial vector, and identifying one or more influential tokens as those which are associated with the one or more primary key values, and which had a larger influence in generation of the artificial vector of the input primary key values than other primary key values.

2. The system of claim 1, wherein the at least one of the computer executable instructions further:

displays the dominant traits of the query input reflected in an output of the query input.

3. The system of claim 1, wherein at least one of the computer executable instructions further:

interprets results from queries on existing data and unseen data.

4. The system of claim 1, wherein the identifying the dominant traits comprises comparing common influential tokens belonging to the query input and to the query output.

5. The system of claim 1, wherein the query input is further based on non-primary key values, and wherein the identifying the dominant traits further comprises locating influential neighborhood tokens.

6. The system of claim 1, wherein incorporating the co-occurrence measurements comprises:

identifying highest co-occurring values in the query input.

7. The system of claim 1, wherein incorporating the co-occurrence measurements comprises:

identifying highest co-occurring values in the query output.

8. A computer implemented method of providing insights to interpret results of a semantic clustering SQL Cognitive Intelligence (CI) query, comprising:

identifying, using a processor, by incorporating co-occurrence measurements, dominant traits of a query input; and determining, using the processor, a ranking of query results by identifying influential tokens of the query input based on data statistics and observing the dominant traits in influential tokens of a query output, wherein the query input is based on one or more primary key values, and the identifying the influential tokens comprises:

transforming the query input to create an artificial vector, and identifying one or more influential tokens as those which are associated with the one or more primary key values, and which had a larger influence in generation of the artificial vector of the input primary key values than other primary key values.

9. The computer implemented method of claim 8, further comprising:

displaying, using the processor, the dominant traits of the query input reflected in an output of the query input.

10. The computer implemented method of claim 8, further comprising:

comparing, using the processor, common influential tokens belonging to the query input and to the query output in determining the dominant traits.

11. The computer implemented method of claim 8, further comprising:

locating, using the processor, influential neighborhood tokens in determining the dominant traits; wherein the query input is further based on non-primary key values.

12. The computer implemented method of claim 8, wherein incorporating the co-occurrence measurements comprises:

identifying, using the processor, highest co-occurring values in the query input.

13. The computer implemented method of claim 8, wherein incorporating the co-occurrence measurements comprises:

identifying, using the processor, highest co-occurring values in the query output.

14. A computer program product for providing insights to interpret results of a semantic clustering SQL Cognitive Intelligence (CI) query, the computer program product comprising a computer readable storage medium having program instructions embodied therewith, the program instructions executable by a processor to cause the processor to:

identify, by incorporating co-occurrence measurements, dominant traits of a query input;

determine, a ranking of query results by identifying influential tokens of the query input based on data statistics and observing the dominant traits in influential tokens of a query output, wherein the query input is based on one or more primary key values, and the identifying the influential tokens comprises:

transforming the query input to create an artificial vector, and identifying one or more influential tokens as those which are associated with the one or more primary key values, and which had a larger influence in generation of the artificial vector of the input primary key values than other primary key values.

15. The computer program product of claim 14, wherein the program instructions further cause the processor to:

display, the dominant traits of the query input reflected in an output of the query input.

16. The computer program product of claim 14, wherein the program instructions further cause the processor to:

compare common influential tokens belonging to the query input and to the resulting query output in determining the dominant traits.

17. The computer program product of claim 14, wherein the program instructions further cause the processor to:

locate influential neighborhood tokens in determining the dominant traits; wherein the query input is based on non-primary key values.

18. The computer program product of claim 14, wherein the program instructions further cause the processor to:

interpret results from queries on existing data and unseen data.

19. The computer program product of claim 14, wherein incorporating the co-occurrence measurements comprises:

identifying highest co-occurring values in the query input.

20. The computer program product of claim 14, wherein incorporating the co-occurrence measurements comprises:

identifying highest co-occurring values in the query output.

* * * * *